United States Patent [19]
Bata et al.

[11] 3,861,588
[45] Jan. 21, 1975

[54] THERMOMECHANICAL AUTOMATIC TEMPERATURE CONTROL UNIT

[75] Inventors: George T. Bata, Grafton; Raymen F. Emery, Yorktown; Theodore L. Knight, Newport News, all of Va.

[73] Assignee: The Bendix Corporation, Southfield, Mich.

[22] Filed: Sept. 20, 1973

[21] Appl. No.: 399,233

[52] U.S. Cl.......................... 236/13, 236/87, 137/85
[51] Int. Cl...................... G05d 23/13, G05b 11/50
[58] Field of Search ................ 236/87, 86, 101, 13; 137/85

[56] References Cited
UNITED STATES PATENTS

| | | | |
|---|---|---|---|
| 3,294,320 | 12/1966 | Franz | 236/87 |
| 3,394,722 | 7/1968 | Stranahan | 137/85 X |
| 3,456,669 | 7/1969 | Lloyd | 137/85 X |

*Primary Examiner*—William E. Wayner
*Attorney, Agent, or Firm*—W. G. Christoforo; Bruce L. Lamb

[57] ABSTRACT

A thermomechanical automatic temperature control device has a resettable bimetal which senses in-car temperature. The bimetal drives a control valve through a vacuum feedback diaphragm, the control valve controlling the vacuum at a vacuum motor which positions a blend door in a stream of air being temperature controlled. The control valve is located in a floating means biased in the direction of decreased vacuum by a vent valve which is spring bias closed. The degree of vacuum at the vacuum motor is thus maintained by the vent valve and control valve and responds to desired temperature, in-car temperature and control vacuum.

13 Claims, 2 Drawing Figures

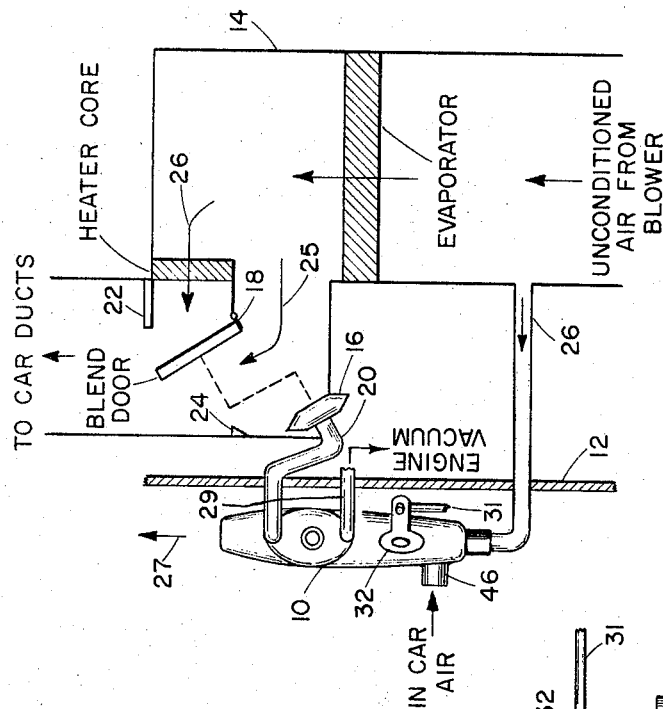
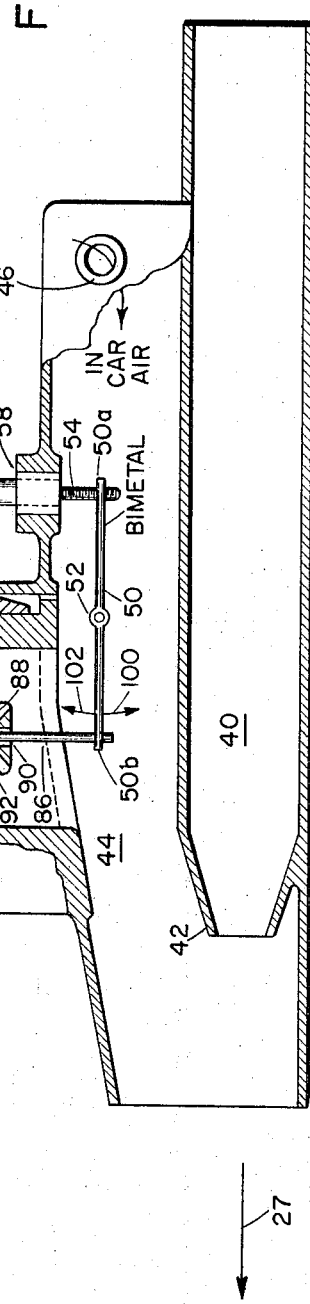
FIG. 1
FIG. 2

THERMOMECHANICAL AUTOMATIC TEMPERATURE CONTROL UNIT

BACKGROUND OF THE INVENTION

This invention relates to automatic temperature control systems, particularly for automobiles. The invention more particularly relates to a system for automatically controlling the heating and cooling of air by an automotive air conditioning system to maintain a selected in-car temperature constant.

It has been common to mix heated air and cool air in such proportions with the help of an air mix damper or blend door so that the mixture of such air is at the temperature set by the vehicle operator. Automatic temperature control units have been used to provide this air mixing to produce air at the desired temperature automatically. The more sophisticated and expensive of the automatic temperature control units additionally control the air blower speed, dehumidify the conditioned air and determine whether the conditioned air is delivered into the interior of the passenger section of the vehicle through the air conditioning vents or the heater floor vents. Other less sophisticated and less expensive automatic temperature control units have controlled only the position of the blend air door, leaving the control of blower speed, the selection of air conditioning vents, floor heat vents and other control parameters to the operator of the vehicle. These inexpensive, automatic temperature control units have generally relied upon a continuous bleeding of engine vacuum for their operation with engine vacuum being regulated and supplied to a vacuum motor to control the position of an air blend door. This continuous bleeding of engine vacuum has dictated that the orifices through which the automatic temperature control unit communicates to the source of engine vacuum be small and restrictive to prevent undue loading of the automobile engine with the result that the response time of this type of automatic temperature control units is quite long.

SUMMARY OF THE INVENTION

The present invention is a thermomechanical automatic temperature control which comprises a vacuum regulator for controlling the vacuum at a blend air door vacuum motor positioner. The vacuum regulator receives ambient air through a vent valve and engine vacuum through a vacuum control valve. The vacuum regulator delivers the controlled vacuum to the aforementioned vacuum motor positioner. The vacuum regulator operates, in general, in response to the difference between a desired temperature set by the vehicle operator and actual in-car temperature to produce the aforementioned controlled vacuum. The degree of controlled vacuum supplied to the vacuum motor positioner comprises a feedback signal to the vacuum regulator.

The vacuum regulator, briefly, comprises an interior chamber which communicates directly with the blend air door vacuum motor positioner and within which the controlled vacuum is produced. A control valve is located in a floating member within the interior chamber with the automobile engine vacuum communicating directly to the interior of the floating member. The interior of the floating member controllably communicates with the interior chamber through the control valve when the control valve is opened. Otherwise, the interior of the floating member is preferably closed to prevent leakage of vacuum. The control valve operates in response to bimetal movements through a rod connecting the bimetal with the control valve, the rod passing through and being attached to a diaphragm, herein termed vacuum feedback diaphragm, which comprises an interface between the interior chamber and the ambient in-car air, the bimetal being located in the in-car air. The control valve is thus operated not only in response to the movements of the bimetal but also in response to the pressure differential across the vacuum feedback diaphragm, that is, basically, the degree of the control vacuum.

A vent valve communicates ambient air with the interior chamber of the vacuum regulator, with the vent valve being spring biased closed. The vent valve is opened in response to movement of the floating member when the combination of forces from the bimetal and the vacuum feedback diaphragm is such as to close the control valve with sufficient force to force the floating member against the vent valve to thereby open it against the biasing spring.

In its normal condition, that is when the in-car temperature, desired temperature and vacuum feedback are in equilibrium, the floating member assumes a position such that both the vent valve and the control valve are closed so that the vacuum within the interior chamber of the vacuum regulator and hence the vacuum at the vacuum driven motor, remains constant. In this equilibrium condition there is no air bled into the regulator, hence there is no waste of engine vacuum.

It is thus an object of this invention to provide an automatic temperature control which operates on thermomechanical principles.

It is another object of this invention to provide a thermomechanical automatic temperature control, particularly for use in automotive vehicles which provides a controlled vacuum for controlling desired temperature in response to actual temperature and desired temperature with feedback in the form of controlled vacuum.

It is another object of this invention to provide an automatic temperature control of the type described which will respond rapidly to changes in its environment.

It is a further object of this invention to provide an automatic temperature control of the type described which conserves engine vacuum.

BRIEF DESCRIPTION OF THE DRAWINGS

FIG. 1 is a schematic representation of a portion of a motor vehicle automatic temperature control system constructed in accordance with this invention.

FIG. 2 is a side view of a vacuum regulator, cut away to show the operation of its interior parts.

DESCRIPTION OF THE PREFERRED EMBODIMENT

Referring now to the figures wherein like elements are numbered alike and particularly referring to FIG. 1, there is seen a vacuum regulator 10 mounted in the passenger compartment side of an automobile fire wall 12. Located optionally exterior to the passenger compartment is duct work 14 which receives unconditioned air from a blower (not shown). The air is conditioned within the duct work and delivered to the car ducts, suitably either the air conditioning ducts, the heater ducts or the defroster ducts. The unconditioned air from the blower passes through an air conditioning evaporator. A blend door pivoted at axle 18 is controlled by a vacuum motor 16 which receives a controlled vacuum via tubing 20 from vacuum regulator 10. As will be explained below, the position of the blend door is in accordance with the operation of vacuum regulator 10. The blend door suitably can be positioned against stop 22 or against stop 24, pivoting on axle 18, or suitably at any position intermediate thereof. If the blend door is against stop 24 then all of the air passing through the evaporator also passes through the heater core, following arrow 26. In this condition the operation of the automatic temperature control system is somewhat like that of a dehumidifier where the unconditioned air is cooled and dehumidified by the evaporator and then reheated in the heater core before delivery to the passenger compartment.

With the blend door against stop 22 the air passing through the evaporator cannot pass through the heater core but rather follows the path of arrow 25 to the car ducts, eventually into the passenger compartment. In this condition maximum cooling of the unconditioned air occurs. With the blend door intermediate these two extreme positions, a portion of the air from the evaporator will follow the course of arrow 25 while another portion will follow the course of arrow 26 through the heater core, to thus produce a mixture of cooled and heated air downstream from the blend door. The ratio of this mixture is, of course, dependent upon the specific position of the blend door, the percentage of heated air being less as blend door approaches stop 22 and being more as blend door approaches stop 24.

A conduit 26 permits a small portion of the unconditioned air to be delivered to the vacuum regulator 12 for purposes to be described below. An aspirator within the vacuum regulator and which will be seen in detail in FIG. 2 receives the air from conduit 26 and causes a small portion of in-car air to be drawn into the vacuum regulator via port 46. This air is exhausted from the vacuum regulator, as indicated by arrow 27, into the passenger compartment. The use of this air, while within vacuum regulator 10 will be explained below.

The vacuum regulator 10 receives raw vacuum, suitably from the engine manifold, via a conduit 29. The set point, that is the desired in-car temperature setting, is set into the vacuum regulator suitably via a flexible cable 31, attached to a bell crank 32. Flexible cable 31 is shown cut away; however, it should be understood that the end not shown is suitably connected to controls on the dashboard for manipulation by the operator.

Refer now to FIG. 2 which shows vacuum regulator 10 in side elevation cut away to show its interior parts. An aspirator 40 receives unconditioned air from conduit 26, previously seen in FIG. 1, which passes through venturi nozzle 42. In the manner well known to those skilled in the art the air being expelled from venturi nozzle 42 will create a low pressure so as to draw ambient air, in this case in-car air, through port 46 and through passageway 44 to be expelled together with the aspirated air from the vacuum regulator as indicated by arrow 27 seen here and also seen in FIG. 1. By this operation in-car air is drawn over a bimetal 50 which is freely pivoted at fulcrum 52. An end 50a of the bimetal 50 is threaded and received by a stud 54. Stud 54 is suitably an integral part of the rod 56. Bell crank 32 is shown attached to rod 56, with flexible cable 31 being attached to bell crank 32. It should be obvious that manipulation of flexible cable 31 will cause rotation of bell crank 32 about the logitudinal axis of rod 56, thereby rotating the rod to cause end 50a of bimetal 50 to be raised or lowered about pivot 52.

Rod 56 is supported in bearing 58, the means for captivating the rod within the bearing being omitted for clarity; however, these means should be apparent to one skilled in the art. It will become apparent as this description proceeds to one skilled in the art that it will be desirable to provide some means for calibrating the vacuum regulator. One calibration means might comprise means for rotating rod 56 with bell crank 32 detached therefrom. Since means of this type should be obvious to those skilled in the art they have also been omitted for the sake of clarity.

Vacuum regulator 10 includes an internal chamber 60 which is suitably of cylindrical shape, having a vent valve 62 and a control valve 68 located on the axis of the cylinder. Vent valve 62 is biased by spring 66 against valve seat 64. An air filter 67 filters air entering chamber 60 through vent valve 62.

Chamber 60 is divided into two parts by a floating member 70 comprised of an upper diaphragm 72 and a lower diaphragm 74 suitably held apart by air filter means 75. The space between diaphragms 72 and 74 communicates through passage 76 and tube 29 with engine vacuum, as also seen in FIG. 1. Diaphragm 72 includes a centrally located disposed boss 80 which receives an extension of valve 62. Diaphragm 74 includes a centrally located valve seat 82 which cooperates with valve 68 to control communication between chamber 60 and the space between diaphragms 72 and 74, that is, engine vacuum. A small helical spring 69 provides a slight upward bias on valve 68 and is helpful in setting the initial conditions of the regulator, in other words, spring 69 permits valve 68 to just close valve seat 82 at some initial vacuum condition, which could be zero vacuum.

It can be seen that the portion of chamber 60 beneath the floating member 70 communicates with the portion of chamber 60 above the floating member 70 through passageway 84 whereby the air pressure in both sections of the chamber is equalized.

A rod 86 is attached to end 50b of bimetal 50, the other end of the rod being attached to the central portion of vacuum feedback diaphragm 88. Rod 86 is supported by bearing 90. Diaphragm 88 forms a portion of the wall of chamber 60, its lower side being exposed to in-car air through passageways 92 and its upper portion being exposed to controlled vacuum through passageways 94.

The bimetal of this design is such that it moves in the direction of arrow 100 when it is desired to increase the controlled vacuum and in the direction of arrow 102 when it is desired to decrease or vent the controlled vacuum. It is generally desirable that when the controlled vacuum is fully vented that the blend door (referring to FIG. 1) is fully against stop 24. Thus, bimetal 50 should be arranged so that it moves in the direction of 102 when it is desired that the blend door move towards stop 24, that is when it is desired to increase the temperature of the air being delivered to the passenger compartment.

Assume now that the in-car air temperature is higher than the desired temperature. This is equivalent to a raising of end 50a of bimetal 50, whereby end 54b is lowered. To bring the in-car temperature to the desired air temperature in this case it is necessary that the blend door of FIG. 1 be moved toward stop 22. To accomplish this it is required that the controlled vacuum within chamber 60, and hence at the vacuum motor, be increased. In this case control valve 68 is open, thus permitting communication between the engine vacuum and chamber 60 to thereby increase the vacuum therein. This, of course, not only moves blend door toward stop 22 but in increasing the vacuum in chamber 60 it causes the pressure differential across vacuum feedback diaphragm 88 to increase in a direction to oppose the force exerted by bimetal 50 on rod 86. In addition, as the incar air cools, the bimetal 50 will flex so that its end 50b will move in the direction of arrow 102. An equilibrium point will be reached wherein the force generated by bimetal 50 will be balanced by the forces generated by vacuum feedback diaphragm 88 to close valve 68.

Assume again that the automatic temperature control system is at equilibrium, that is with the control vacuum in chamber 60 at a constant and proper level with respect to the desired temperature. Assume also that the in-car temperature drops below the desired temperature, either by manipulation of the flexible cable 31 or by cooling of the vehicle, such as when it enters into a shady area or otherwise cooler environment. Immediately prior to this the forces generated by bimetal 50 are, of course, balanced with the forces generated by the vacuum feedback diaphragm 88. However, when the in-car air temperature becomes lower than the desired temperature tthe forces generated by the bimetal will be such as to move end 50b in the direction of arrow 102. This tends to keep the control valve 82 closed and in addition, forces the floating member 70 upward to unseat vent valve 62, thereby admitting air into chamber 60 to decrease the vacuum therein. This, of course, moves the door of FIG. 1 toward stop 24 to increase the percentage of air which passes through the heater core. In addition, as the vacuum of the chamber 60 decreases, an additional downward force is generated by the changing pressure differential across the feedback diaphragm to oppose the upward force of the bimetal. Eventually a new equilibrium point is reached wherein the desired air temperature, the in-car air temperature and the controlled vacuum are balanced. At this time the control valve 68 and vent valve 62 are closed.

The embodiment of FIG. 1 contemplates only one of a number of possible uses of the invention. For example, it is possible that the automatic temperature control system shown could be used without an air cooling mechanism, such as the illustrated evaporator. In that case, although the unconditioned air from the blower will not be cooled to depress the air temperature below ambient air temperature it would be possible to operate the system as an air heater wherein the amount of heating is controlled. It would also be possible with or without an air cooler to provide some sort of mixing means downstream to provide for optional recirculation of the air within the passenger compartment or addition of fresh outside air. It is also possible to place the evaporator upstream from the blend door. However, this is not desirable since this would not permit the degree of air dehumidification that is possible with the illustrated embodiment. It is, of course, also possible to use the vacuum regulator 10 of this invention and to provide other automatic means of controlling the speed of the blower and for controlling other functions of the automatic temperature control system if a more sophisticated automatic temperature control system is desired. In any event, alterations and modifications of the invention being obvious to one skilled in the art, the invention is to be limited only by the true scope and spirit of the appended claims.

The invention claimed is:

1. A vacuum regulator for use in an automatic temperature control system wherein temperature is controlled in response to controlled vacuum comprising:
   a source of vacuum;
   a pressure source;
   a sealed chamber, the vacuum within which comprises said controlled vacuum;
   a first valve means for communicating said sealed chamber with said pressure source when open and including means for biasing said first valve means closed;
   floating means within said chamber connected to said first valve means and biased by said first valve means in a second direction while said first valve means is open, said floating means having an interior volume which communicates with said source of vacuum, said first valve means being opened when said floating means moves in a first direction to a first predetermined position and responsive to movement of said floating means in a second direction to a second predetermined position for allowing said first valve means to close;
   second valve means cooperating with said floating means for communicating the interior volume of said floating means with said sealed chamber when open and including second means for biasing said second valve means closed, said floating means being biased in said first direction by said second valve means when closed;
   bimetal means for generating a first force in response to change in the temperature to be controlled; and,
   a vacuum feedback diaphragm for generating a second force in response to pressure difference thereacross to accumulate with said first force, said pressure difference being related to said controlled vacuum and including means connecting said bimetal means, said vacuum feedback diaphragm and said second valve means and along which said first and second forces accumulate and act; wherein said second valve means is closed and causes said floating means to move in said first direction in response to the accumulation of said first and second forces over a predetermined threshold.

2. In the device of claim 1 wherein said automatic temperature control system is to condition air moving in a duct and including a heater core located within said duct, at least a portion of said duct shunting said heater core and including a blend air door for determining the proportions of air moving in said duct which pass through said heater core and through the shunt portions, a vacuum motor responsive to said controlled vacuum for positioning said blend door.

3. The device of claim 1 wherein said first and second valve means are disposed on a common line and wherein said first and second forces act along said common line.

4. The device of claim 3 wherein said vacuum feedback diaphragm has a center and is disposed with said line passing through said center so that said diaphragm is perpendicular to said line, and wherein said floating means has a center which coincides generally with said line, said floating means being disposed generally perpendicular to said line, movement of said floating means being generally along said line.

5. Vacuum regulator means for use in an automatic temperature control system wherein temperature of an air stream is regulated in response to a controlled vacuum comprising:

a source of vacuum;

a pressure source;

a sealed chamber, the vacuum within which comprises said controlled vacuum;

first valve means for communicating said sealed chamber with said pressure source when open, and including means for biasing said first valve means closed in a second direction;

floating means within said chamber connected to said first valve means and biased by said first valve means in said second direction while said first valve means is open, said floating means having an interior volume which communicates with said source of vacuum, said floating means being responsive to movement of said floating means in a first direction opposite said second direction to open said first valve means;

second valve means carried by said floating means for communicating the interior volume of said floating means with said sealed chamber when open, said first and second valve means being disposed approximately on a common line, said first and second directions being in one and an opposite direction along said common line;

thermomechanical means responsive to temperatures related to the temperature to be regulated for generating a force along said common line; and, vacuum feedback means for generating second force proportional to said controlled vacuum to accumulate with said first force, said second valve means being responsive to accumulation of said forces in said first direction for closing said second valve means and responsive to accumulation of forces in said second direction for opening said second valve means, and wherein said floating means responds to accumulation of forces in said second direction above a predetermined threshold for causing said floating means to move in said first direction.

6. The vacuum regulator means of claim 5 wherein said vacuum feedback means comprises a diaphragm which forms at least a part of the enclosure of said sealed chamber.

7. The vacuum regulator of claim 5 wherein said thermomechanical means includes means for generating a third force along said common line in response to a desired temperature setting.

8. The vacuum regulator means of claim 7 wherein said thermomechanical means comprises a bimetal at least a portion of which moves along said common line in response to change of temperature to which it is exposed, said portion also moving along said common line in response to a desired temperature setting.

9. The vacuum regulator means of claim 8 wherein said vacuum feedback means comprises a diaphragm for generating said second force in response to the pressure differential thereacross, said controlled vacuum being applied to one side of said diaphragm and the air whose temperature is to be regulated being applied to a second side of said diaphragm.

10. The vacuum regulator means of claim 9 including a vacuum motor means responsive to said controlled vacuum for regulating the ratio of mixture of a relatively warm air stream with respect to a relatively cool air stream to produce said air stream whose temperature is controlled.

11. The vacuum regulator means of claim 10 wherein said vacuum motor means includes a blend air door for regulating said ratio.

12. The vacuum regulator means of claim 11 including an aspirator which receives air from one of the air streams for drawing air whose temperature is to be regulated across said bimetal means.

13. The vacuum regulator of claim 5 wherein said floating mean comprises upper and lower spaced apart diaphragms sealingly connected to the walls of said chamber whereby the space between said diaphragms is generally sealed from said chamber and wherein said floating means is relatively free to move along at least a portion of said common line, said second valve means comprising a passage through at least one of said diaphragms for communicating the space between said diaphragms with said chamber when said second valve means is opened, said source of vacuum being communicated to the space between said diaphragms; and, means for providing relatively unrestricted communication between that portion of said chamber above said upper diaphragm with that portion of said chamber below said lower diaphragm.

* * * * *